Patented Mar. 14, 1933

1,901,163

UNITED STATES PATENT OFFICE

CARL G. HINRICHS, OF ST. LOUIS, MISSOURI

PROCESS OF TREATING EMULSIONS

No Drawing.  Application filed March 12, 1926. Serial No. 94,324.

My invention relates to the art of treating emulsions produced by oil wells, nearly all of which wells through a large or small period of their existence produce a substantial quantity of emulsions of oil and water, commonly known as bottom settlings or roily oils. Where these oils contain more than two percent of water they are usually refused by the pipe lines and hence cannot be piped to the refineries where some recovery might be had by use of the complete distilling apparatus there located. These roily oils contain quantities of water substantially in excess of two percent and the production of such oil not only creates the problem of loss, because of failure to receive any return therefrom, but is often an additional expense in that storage must be provided for the same as the disposition thereof by natural drainage is frequently prohibited.

Various methods of attacking these emulsions have been proposed and have been followed with varying degrees of success. Among these methods are the use of electrical currents and other means of agitation for the purpose of destroying the surface tension of the emulsified particles. It has been suggested also to break the emulsions by attempting to reverse the dispersed phase and the continuous phase of the emulsions. It has also been suggested that the stability of the emulsion is caused by the presence therein of alkaline earths, and various means of precipitating these earths have been suggested.

I believe that all of the above-mentioned methods of treating roily oil have involved the application of heat, and, as previously indicated, while these various methods have been partially successful, there are many emulsions which are not treated satisfactorily by any of the above methods.

It is an object of my invention to provide a method and product which will effectively treat roily oils, and particularly those roily oils which cannot be successfuly treated by any methods or substances now in use.

It is an additional object of my invention to treat roily oils without the use of heat above atmospheric temperatures as the provision of heat has two disadvantages; first, the expense necessary for fuel and equipment to provide and apply the heat; and, second, because the use of heat drives off the more volatile constituents of the roily oil which are lost as there is no provision at the well for collecting these valuable constituents.

For theoretical reasons, I have concluded that the stability of the emulsions largely depends upon the interfacial curves between the continuous phase and the droplets of the dispersed phase, and that if it is possible to increase the radii of these curves the separated droplets of the dispersed phase, presumably water, will coalesce more easily. I have further concluded that the addition of a substance to the emulsion which would tend to penetrate between the interfacial surfaces and would be characterized by relatively heavy molecular weight would tend to increase the interphase space and to flatten out the interfacial curves and secure the result desired. I have also concluded that if the molecules of the substance were rectangular in shape instead of being wedge shaped, the orientation of the molecule, with its polar and non-polar ends respectively contacting with or penetrating the corresponding liquids of the emulsions, there would be a tendency to flatten the interfacial curvature with the result mentioned above.

In extended experimental work with emulsions of the type referred to I have found that my surmises, as to increased activity in the emulsion breaking process by using products having the characteristics mentioned, were confirmed and that satisfactory results could be obtained with roily oils which could not be satisfactorily treated by other known products. I found, furthermore, that I could get the desired results without the use of heat, which is a marked advantage over all previous methods, irrespective of the efficiency of the latter and irrespective of the number of oils which could be treated thereby.

In my work I have started with hydroxyacids (such as lactic acids, ricinoleic acid, and modified hydroxyacids such as hydrolyzed addition or substitution products of fatty acids, resins or oxidized olefins) as these hydroxyacids, when heated, eliminate molecules of water and form more complex products which have almost double, triple, or quadruple the molecular weight of the hydroxyacids from which they are formed. For instance, two molecules of ricinoleic acid, $C_{18}H_{34}O_3$, each having a molecular weight of 298, when heated, will give off a molecule of $H_2O$, (formed by the hydrogen from one molecule and the hydroxyl from the other molecule) molecular weight 18, and produce a molecule of monobasic di-ricinoleic acid, $C_{36}H_{66}O_5$ having a molecular weight of 578. This product has approximately half the neutralizing value of the combined value of the parent acids. Products having a third, a fourth, and even less neutralizing value than the combined original acids may be produced by additional dehydration by heat, that is, I can double, triple, or quadruple the molecular weight while retaining the mono-valent character of the resulting molecule. I have found that this product will satisfactorily treat many roily oils. I have also obtained excellent results by adding sodium hyroxide to the dehydrated hydroxyacid whereby the hydrogen combined with the carboxyl radical is replaced by sodium, forming a salt, thereby producing a neutralized polymerized di-ricinoleic acid, the molecular weight of which is 600.

Another example of the production of a satisfactory product is illustrated in the combination of ricinoleic acid with lactic acid, which acids are mixed and then heated to approximately one hundred fifty degrees centigrade with the following result:

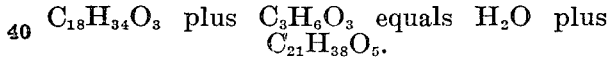
$C_{18}H_{34}O_3$ plus $C_3H_6O_3$ equals $H_2O$ plus $C_{21}H_{38}O_5$.

Various addition and substitution products of the heat dehydrated hydroxyacids such as di-ricinoleic acid or tri-ricinoleic acid or tetra-ricinoleic acid or penta-ricinoleic acid may be obtained by the use of sulphuric acid to obtain a sulphonated product, or the use of chlorine to produce a mono-chloro product, a di-chloro product, or a tri-chloro product, or by the use of an alkyl sulphuric acid such as ethyl sulphuric acid or amyl sulphuric acid to produce a corresponding derivative of a dehydrated hydroxyacid which mixes unusually well with water when it is desired to use a water mixture to add the product to the emulsion to be treated.

In practicing this method of breaking emulsions, I prefer to use the agents in water suspension, readily attained by the addition of a small amount of ammonium or potassium or sodium hydroxide thereto, mixing this with the oil as it flows from the well, or before it flows from the well, amounts regulated by experience according to the consistency of the B. S., to the tenacity of the emulsion, to the temperature, etc. One barrel of the demulsifying agent will treat satisfactorily from one thousand to two hundred thousand barrels of B. S. according to whether the conditions are more or less favorable.

Any suitable means for agitating the roily oil and the treating product may be used to advantage, such as passing the oil and product through a pipe with successive contracted and expanded portions, or by using mechanical mixing devices. I also contemplate the use of my product in treating the roily oil with electrical currents, centrifuges, and filters, all of which are recognized as well known expedients in this art.

It is possible to use my product alone or in conjunction with other known chemical products intended for the same purpose.

Comparative experiments with my product and commercial products now in use indicate that the heavy molecular agents mentioned above when used at temperatures of sixty to seventy degrees Fahrenheit will treat roily oils as satisfactorily as previously known commercial products when employed at temperatures between one hundred fifty and two hundred fifty degrees Fahrenheit. By satisfactory results I mean the separation from the emulsion of substantial quantities of oil having less than two percent of water emulsified therewith, such being acceptable to the pipe line companies.

At summer temperatures, the quantity of my products required for the same result will be reduced to about ten percent of the quantities required at the lower temperatures. From this it is obvious that the use of heat markedly increases the efficiency of my product although heat is not essential to its use, and the absence of the necessity of artificial heat greatly increases the value of the product and treatment, as the provision of heat at the well is extremely difficult at times and is always expensive. Furthermore, the treatment of the roily oil without heat retains the gasoline and other lighter hydrocarbons in the oil delivered by the producer to the refiner.

The above description will suggest many variations in the combinations other than those specifically formulated by me. I contemplate the exclusive use of all such modifications of my invention as are included in the scope of my claims.

However, it should be understood from the foregoing description that in specifying "dehydrated" hydroxyacid I am referring to the chemical dehydration resulting from the elimination of a molecule of water during the union of two molecules of the parent hydroxyacid and it is not intended to merely specify a product from which physically combined water has been removed. I use the term "heat dehydrated" to distinguish from a dehydration produced by the addition of a chemical such as sulphuric acid which not only eliminates one or more molecules of water but enters into the parent substance and produces a new chemical including elements not found in the parent substance. I refer here, particularly, to the exclusion of a process of dehydration of fatty acids which is effected by the use of sulphuric acid. This has been suggested by others but produces compounds more or less uncertain in molecular structure due to the fact that the sulphuric acid breaks up the fatty acid. Such products are objectionable also because they contain a quantity of free sulphuric acid which must be removed before the product can be used commercially, due to the objections by pipe lines to the admission of oil containing any sulphuric acid.

I claim:

1. The process of treating roily oils from petroleum wells which includes the addition thereto of a product resulting from the application of external heat to ricinoleic acid to form and eliminate water molecules therefrom.

2. The process of treating roily oils from petroleum wells which includes the addition thereto of a modification of a product resulting from the application of external heat to ricinoleic acid to form and eliminate water molecules therefrom.

3. The process of treating roily oils from petroleum wells which includes the addition thereto of a partially neutralized product resulting from the application of external heat to ricinoleic acid to form and eliminate water molecules therefrom.

4. The process of treating roily oils from petroleum wells which includes the addition thereto of a neutralized product resulting from the application of external heat to ricinoleic acid to form and eliminate water molecules therefrom.

5. The process of treating roily oil emulsions from petroleum wells which includes treating the emulsion with an alkyl sulphuric acid derivative of a product resulting from application of external heat to a hydroxyacid in the group including lactic, ricinoleic and hydrolyzed substitution and addition products of fatty acids to form and eliminate water molecules therefrom.

6. The process of treating roily oils from petroleum wells which includes the addition thereto of an alkyl sulphuric acid derivative of a product resulting from the application of external heat to ricinoleic acid to form and eliminate water molecules therefrom.

7. The process of treating roily oils which consists in treating same with an agent formed by eliminating one molecule of water from two molecules of a ricinoleic acid.

8. The process of treating roily oil emulsions from petroleum wells which includes the addition thereto of a modification of a water soluble dehydrated hydroxyacid in the group including lactic, ricinoleic and hydrolyzed substitution and addition products of fatty acids.

9. The process of treating roily oil emulsions from petroleum wells which includes the addition thereto of a modification of a water soluble dehydrated ricinoleic acid.

10. The process of treating roily oil emulsions from petroleum wells which includes the addition thereto of an alkyl sulphuric acid derivative of a water soluble dehydrated hydroxyacid in the group including lactic, ricinoleic and hydrolyzed substitution and addition products of fatty acids.

11. The process of treating roily oil emulsions from petroleum wells which includes the addition thereto of an alkyl sulphuric acid derivative of a water soluble dehydrated ricinoleic acid.

12. The process of treating roily oil emulsions from petroleum wells which includes the addition thereto of an agent formed by heating a hydroxyacid in the group including lactic, ricinoleic, hydrolyzed substitution and addition products of fatty acids, and mixtures thereof, to unite at least two molecules of the parent substance and eliminate at least one molecule of water therefrom.

13. The process of treating roily oil emulsions from petroleum wells which includes the addition thereto of an agent formed by heating a hydroxyacid in the group including lactic, ricinoleic, hydrolyzed substitution and addition products of fatty acids, and mixtures thereof, to unite at least two molecules of the parent substance and eliminate at least one molecule of water therefrom and then neutralizing the product of dehydration.

14. The process of treating roily oil emulsions from petroleum wells which includes the addition thereto of an agent formed by heating a hydroxyacid in the group including lactic, ricinoleic, hydrolyzed substitution and addition products of fatty acids, and mixtures thereof, to unite at least two molecules of the parent substance and eliminate at least one molecule of water therefrom and then rendering the product of dehydration capable of suspension in water by the addition thereto of a medium from the group including ammonium potassium and sodium hydroxide.

15. The process of treating roily oil emulsions from petroleum wells which includes the treatment thereof with an agent comprising a modification of the product of dehydration described in claim 14.

16. The process of treating roily oil emulsions from petroleum wells which is characterized by the use of the agent described in claim 1 at atmospheric temperatures.

17. The process of treating roily oil emulsions from petroleum wells which is characterized by the use of the agent described in claim 2 at atmospheric temperatures.

18. The process of treating roily oil emulsions from petroleum wells which is characterized by the use of the agent described in claim 3 at atmospheric temperatures.

19. The process of treating roily oil emulsions from petroleum wells which is characterized by the use of the agent described in claim 4 at atmospheric temperatures.

20. The process of treating roily oil emulsions from petroleum wells which is characterized by the use of the agent described in claim 5 at atmospheric temperatures.

21. The process of treating roily oil emulsions from petroleum wells which is characterized by the use of the agent described in claim 6 at atmospheric temperatures.

22. The process of treating roily oils which consists in treating same at atmospheric temperatures with an agent formed by eliminating one molecule of water from two molecules of a ricinoleic acid.

23. The process set forth in claim 8 characterized by being conducted at atmospheric temperatures.

24. The process set forth in claim 9 characterized by being conducted at atmospheric temperatures.

25. The process set forth in claim 10 characterized by being conducted at atmospheric temperatures.

26. The process set forth in claim 11 characterized by being conducted at atmospheric temperatures.

27. The process specified in claim 12 characterized by being conducted at atmospheric temperatures.

28. The process specified in claim 13 characterized by being conducted at atmospheric temperatures.

29. The process specified in claim 14 characterized by being conducted at atmospheric temperatures.

30. The process of treating roily oil emulsions from petroleum wells which includes the addition thereto at atmospheric temperatures of an agent comprising a modification of the product of dehydration described in claim 14.

31. The process of treating roily oils which consists in treating same at atmospheric temperatures with an agent formed by eliminating one molecule of water from two molecules of a hydroxyacid in the group including lactic, ricinoleic and hydrolyzed substitution and addition products of fatty acids.

In testimony whereof I hereunto affix my signature this 10th day of March, 1926.

CARL G. HINRICHS.